United States Patent [19]
Otting et al.

[11] Patent Number: 5,940,746
[45] Date of Patent: *Aug. 17, 1999

[54] CHANNEL SCANNING APPARATUS AND METHOD

[75] Inventors: Marcia Jean Otting, Mundelein; Robert M. Johnson, Jr., Lake Zurich, both of Ill.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/580,871

[22] Filed: Dec. 29, 1995

[51] Int. Cl.$^6$ .................................................. H04B 1/18
[52] U.S. Cl. .................................. 455/161.3; 455/343
[58] Field of Search ................... 455/33.1, 34.1, 455/34.2, 161.1, 161.2, 161.3, 343, 56.1, 54.1, 422, 418, 464

[56] References Cited

U.S. PATENT DOCUMENTS

| | | | |
|---|---|---|---|
| 3,962,553 | 6/1976 | Linder et al. | 179/41 A |
| 4,181,893 | 1/1980 | Ehmke | 325/492 |
| 4,384,361 | 5/1983 | Masaki | 455/31 |
| 4,419,765 | 12/1983 | Wycoff et al. | 455/36 |
| 4,457,018 | 6/1984 | Takayama | 455/33 |
| 4,631,496 | 12/1986 | Borras et al. | 331/1 A |
| 4,796,649 | 1/1989 | Fujiwara | 455/9 |
| 4,903,320 | 2/1990 | Hanawa | 455/34 |
| 4,905,301 | 2/1990 | Krolopp et al. | 455/34 |
| 4,977,611 | 12/1990 | Maru | 455/161 |
| 5,023,932 | 6/1991 | Wakana | 455/34 |
| 5,140,698 | 8/1992 | Toko | 455/76 |
| 5,613,208 | 3/1997 | Blackman et al. | 455/34.1 |
| 5,627,882 | 5/1997 | Chien et al. | 455/464 |

OTHER PUBLICATIONS

Advanced Mobile Phone Service, Inc., Preliminary Cellular Mobile Telephone Equipment Specification, Apr. 1983, p. 4.2.3

*Primary Examiner*—Nguyen Vo
*Assistant Examiner*—Darnell R. Armstrong
*Attorney, Agent, or Firm*—Mark D. Patrick

[57] ABSTRACT

An apparatus (304) for scanning among a plurality of channels in a radio communication system (300) includes receive circuitry (310) and control circuitry (312). The receive circuitry (310) is capable of being tuned to any one of the plurality of channels and measures reception strength of the tuned channel. The control circuitry (312) controls the receive circuitry (310) to scan through all of the plurality of channels one at a time. The control circuitry (312) stores a first reading of a measured reception strength of the tuned channel before powering off the receive circuitry (310). The control circuitry (312) stores a second reading of a measured reception strength of the tuned channel after powering the receive circuitry (310) back on.

19 Claims, 4 Drawing Sheets

CHANNEL SCANNING APPARATUS AND METHOD

FIELD OF THE INVENTION

The present invention relates generally to a radio apparatus and, more particularly, to a channel scanning apparatus and method comprising the radio apparatus.

BACKGROUND OF THE INVENTION

Many radiotelephones are powered by a battery. Those battery powered radiotelephones that minimize power consumption and conserve battery power have a commercial advantage as they help extend the battery operating time.

The radio communication system in which radiotelephones operate include a plurality of channels. The radiotelephone employs a receiver to repeatedly scan among the plurality of channels while the radiotelephone is not in service. The receiver scans through the plurality of channels until it finds one containing service quality data. It is known to periodically power off the receiver during channel scanning to conserve battery power. Known intermittent receiver operation schemes that save battery power during channel scanning are shown in the timing diagrams of FIGS. 1 and 2.

Figure 1:
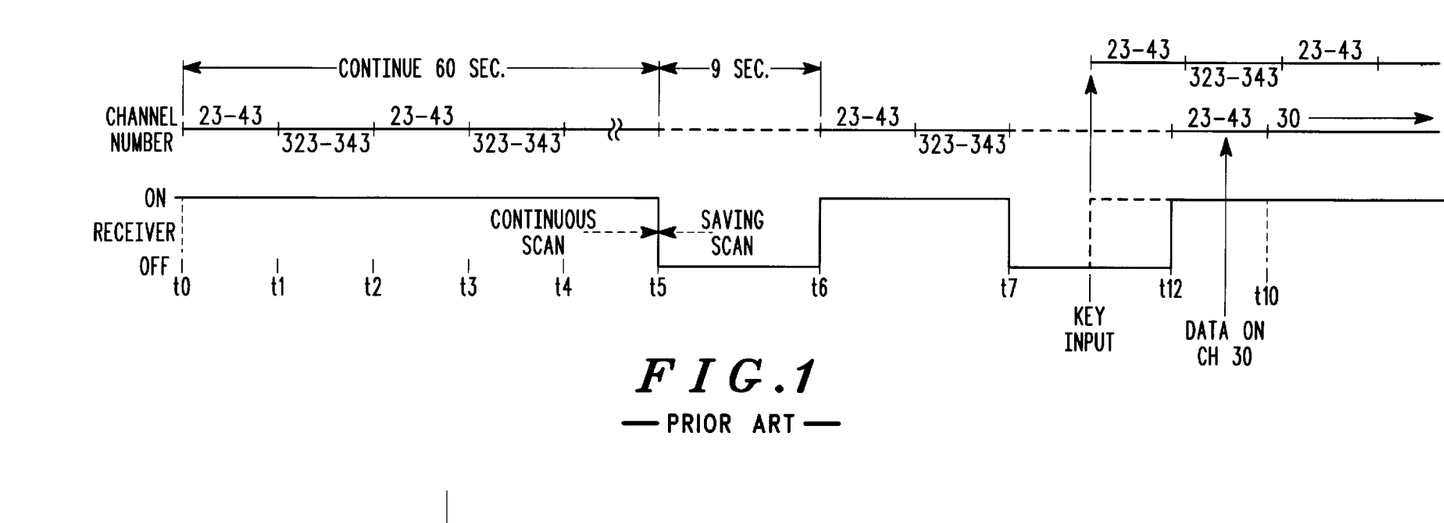
FIG. 1 illustrates a timing diagram of a known intermittent scanning scheme.

FIG. 1 shows a receiver that is initially powered on to perform a continuous scan of all the channels (23 through 43 and 323 through 343) for a predetermined time period, such as 60 seconds. If no channel with service quality data is found during the 60 seconds, the receiver goes into an intermittent scan mode to save battery power. During the intermittent scan mode the receiver is periodically powered on for a scanning period during which data on the strongest channels is examined. The receiver is powered off for a second predetermined time period, such as 9 seconds, between each scanning period. The intermittent scan mode is interrupted when the user actuates a key on a keypad of the radiotelephone or when service quality data is found on a channel during the scanning period.

However, the scheme of FIG. 1 will only save battery power if no service quality data is found during the continuous scan and then only by powering off the receiver for the second predetermined time period during the intermittent scan mode. No battery power is saved during the continuous scan or during the scanning periods of the intermittent scan mode. Additionally, there is no opportunity for the radiotelephone to find service quality data when the receiver is powered off during the second predetermined time period.

Figure 2:
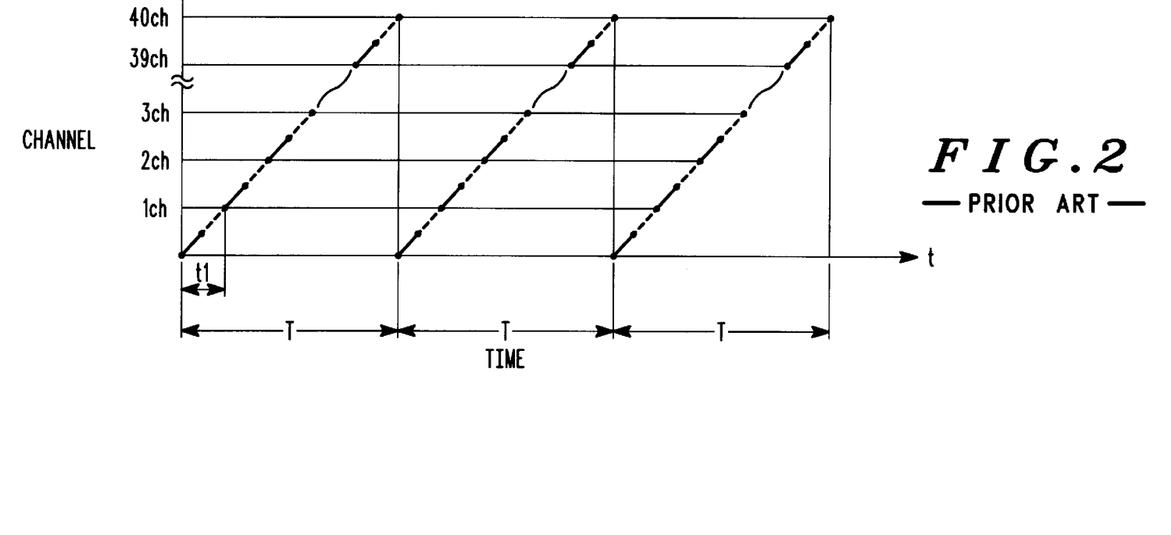
FIG. 2 illustrates a timing diagram of an known alternate intermittent scanning scheme.

In FIG. 2, a receiver scans all of the channels (1 through 40) during a period T. One channel is scanned during each time period $t_1$. The receiver is powered on for a first portion of $t_1$ (denoted by a solid line) during which data on the channel is examined and powered off for a second portion of $t_1$ (denoted by a dotted line). The receiver cycles through each channel until all of the channels are examined for service quality data. The scanning cycle is continued until a scanned channel is determined to contain service quality data.

However, because the scheme of FIG. 2 must determine if service quality data is present at the time each channel is scanned, the scanning period T and partial scanning time $t_1$ must be lengthy. Also, the scheme of FIG. 2 does not discern between weaker and stronger channels having service quality data, but instead selects the first channel with service quality data.

Therefore, what is needed is a channel scanning apparatus and method without lengthy continuous scanning periods, without lengthy periods where the receiver is powered off, and without service quality data checks during the scanning of each channel.

DETAILED DESCRIPTION OF THE PREFERRED EMBODIMENTS

A battery powered apparatus for scanning among a plurality of channels in a radio communication system includes receive circuitry and control circuitry. The receive circuitry is tunable to any one of the plurality of channels and measures reception strength of the tuned channel. The control circuitry controls the receive circuitry to scan through all of the plurality of channels one at a time. During the scan, the control circuitry stores a first reading of a measured reception strength of the tuned channel before powering off the receive circuitry. The control circuitry stores a second reading of a measured reception strength of the tuned channel after powering the receive circuitry back on. Unlike known scanning methods, reception strength readings are taken for each channel before powering off and after powering on the receive circuitry.

Figure 3:
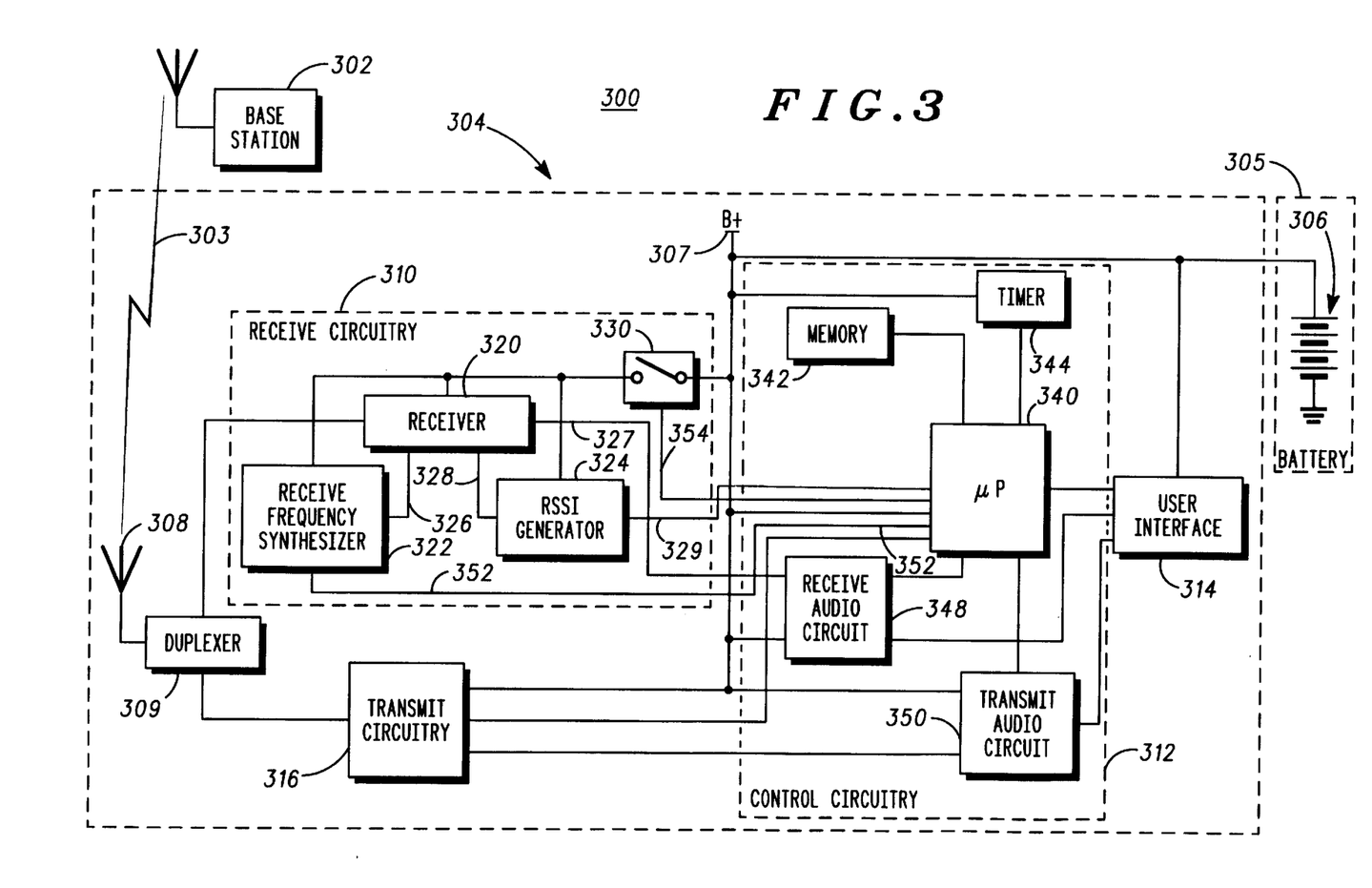
FIG. 3 illustrates a block diagram of a radio communication system including a radio apparatus, receive circuitry of the radio apparatus being shown in limited detail.

FIG. 3 illustrates radio communication system 300. Radio communication system 300 includes base station 302 and radio apparatus 304. Base station 302 provides service to radio apparatuses, such as radio apparatus 304, contained within a particular geographic area. Base station 302 communicates with these radio apparatuses via radio frequency (RF) signals, such as RF signals 303 communicated between base station 302 and radio apparatus 304. RF signals 303 are communicated on data and voice channels within a frequency band designated for use with radio communication system 300. In the illustrated embodiment, radio communication system 300 is an ETACS cellular radiotelephone system operating on frequency band 872 MHz to 905 MHz and 917 MHz to 950 MHz having data and voice channels. Data channels could be channels 23 through 43 and 323 through 343.

Radio apparatus 304 includes antenna 308, duplexer 309, receive circuitry 310, control circuitry 312, user interface 314, and transmit circuitry 316. RF signals 303 detected by antenna 308 are input as electrical RF receive signals through duplexer 309 to receive circuitry 310. Receive circuitry 310 demodulates electrical RF receive signals into data signals and/or voice signals that are coupled to control circuitry 312. Control circuitry 312 delivers voice audio signals to a speaker (not shown) of user interface 314. Voice audio signals entered via a microphone (not shown) of user interface 314 are coupled through control circuitry 312 to transmit circuitry 316 as electrical audio signals. Transmit circuitry 316 modulates the electrical audio signals into electrical RF transmit signals and couples these signals to antenna 308 via duplexer 309. Antenna 308 emits the electrical RF transmit signals as RF signals 303.

Radio apparatus 304 is powered by battery 305, which is detachably coupled thereto. Battery 305 includes electrochemical cells 306 for providing power. A positive terminal of electrochemical cells 306 is coupled to battery supply terminal (B+) 307 of radio apparatus 304. Battery supply terminal 307 supplies battery power to receive circuitry 310, control circuitry 312, user interface 314, and transmit circuitry 316. Battery 305 has a limited electrical life and provides power until it discharges to a voltage level that is insufficient to operate radio apparatus 304.

Receive circuitry 310 includes receiver 320, receive frequency synthesizer 322, and RSSI (received signal strength indicator) generator 324. Receiver 320 is a double superheterodyne type that is well known in the art and, thus, will be described sparingly hereinbelow. Receiver 320 is tuned by receive frequency synthesizer 322. Receive frequency synthesizer 322 applies a local oscillation signal to receiver 320 via signalling line 326. The local oscillation signal has an oscillation frequency that is associated with a channel in radio communication system 300. Application of the local oscillation signal locks receiver 320 to the channel. In the illustrated embodiment, the time required for receive frequency synthesizer to lock receiver 320 is approximately 3 ms. Once "locked", receiver 320 mixes the electrical RF receive signals input from duplexer 309 with the local oscillation signal to extract receive signals pertaining to the channel.

After mixing, the receive signals are maintained in receiver 320 and routed to RSSI generator 324 coupled via reading line 328. Those receive signals maintained in receiver 320 are demodulated and coupled to control circuitry 312 as receive data signals on audio data line 327. Those routed to RSSI generator 324 via reading line 328 are measured by conventional circuitry, such as an envelope detector (not shown), which provides an analog DC voltage proportional to the strength of the receive signals to control circuitry 312 via line 329. The analog signal strength voltage indicates the reception strength of the present channel.

Receive circuitry 310 includes receive switch circuit 330 coupled between battery supply terminal 307 and all of receiver 320, receive frequency synthesizer 322, and RSSI generator 324. Receive switch circuit 330 is controllable to connect battery power to, or disconnect battery power from, receiver 320, receive frequency synthesizer 322, and RSSI generator 324. Switch circuit 330 can be comprised of conventional circuitry, such as a transistor.

Control circuitry 312 includes microprocessor 340, memory 342, timer 344, receive audio circuit 348, and transmit audio circuit 350. Microprocessor 340 can be any suitable microprocessor, such as a 68HC11 microprocessor commercially available from Motorola, Inc. Microprocessor 340 operates radio apparatus 304 by executing algorithms read from memory 342. Microprocessor 340 controls receive frequency synthesizer 322 to tune receiver 320 to a particular channel by sending a channel select signal thereto via channel select line 352. Microprocessor 340 controls receive switch circuit 330 to power on and power off receive circuitry 310 by sending a switch control signal via switch control line 354. Microprocessor 340 is coupled to RSSI generator 324 via line 329 and receives the signal strength voltage therefrom. Microprocessor 340 includes an analog-to-digital converter (not shown) that converts the analog DC voltage of the signal strength voltage into a digital number. The digital number is stored in memory 342.

Memory 342 is coupled to RSSI generator 324 through microprocessor 340, which converts the analog signal strength voltage output from RSSI generator 324 to digital numbers suitable for storage in memory 342. Memory 342 can be a read-only memory (ROM), an erasable programmable read-only memory (EPROM), a random-access memory (RAM), another suitable memory device, or any combination of the aforementioned. Although memory 342 is shown separate from microprocessor 340, it will be recognized that memory 342 could be internal to microprocessor 340 and/or that microprocessor 340 may contain other memory in addition to memory 342. In the illustrated embodiment, memory 342 stores the two largest signal strength voltage readings and their corresponding channel numbers in locations designated the "strongest" location and the "next strongest" location as determined by numerical compares performed by microprocessor 340 on the digital number representation of the analog signal strength voltage of all of the scanned channels Memory 342 also stores multiple signal strength voltage readings of the present channel.

Timer 344 is coupled to microprocessor 340 and includes one or more conventional timer circuits, such as a commercially available timer integrated circuit. Alternately, timer 344 may be a software timer generated within microprocessor 340 or a hardware timer disposed within microprocessor 340. Timer 344, under control of microprocessor 340, measures predetermined time periods for microprocessor 340.

Receive audio circuit 348 is coupled to receiver 320, microprocessor 340, and user interface 314. Receive audio circuit 348 includes conventional circuitry for examining the quality of data of the receive data signals received from receiver 320 via audio data line 327. If the data of the receive data signals is of service quality, receive audio circuit 348 signals microprocessor 340.

Figure 4:
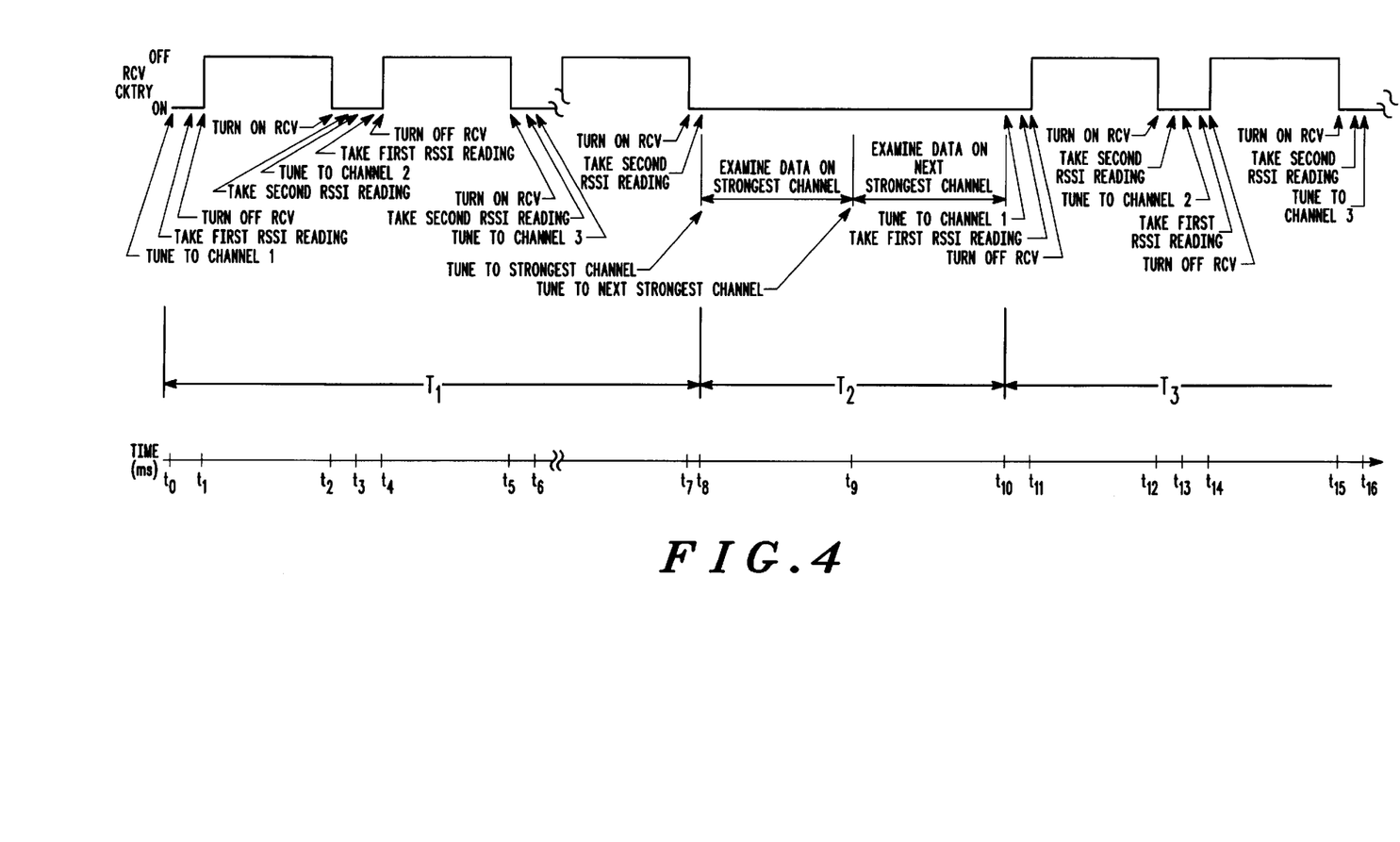
FIG. 4 illustrates a timing diagram of a scanning method employed by radio apparatus of FIG. 3.
Figure 5:
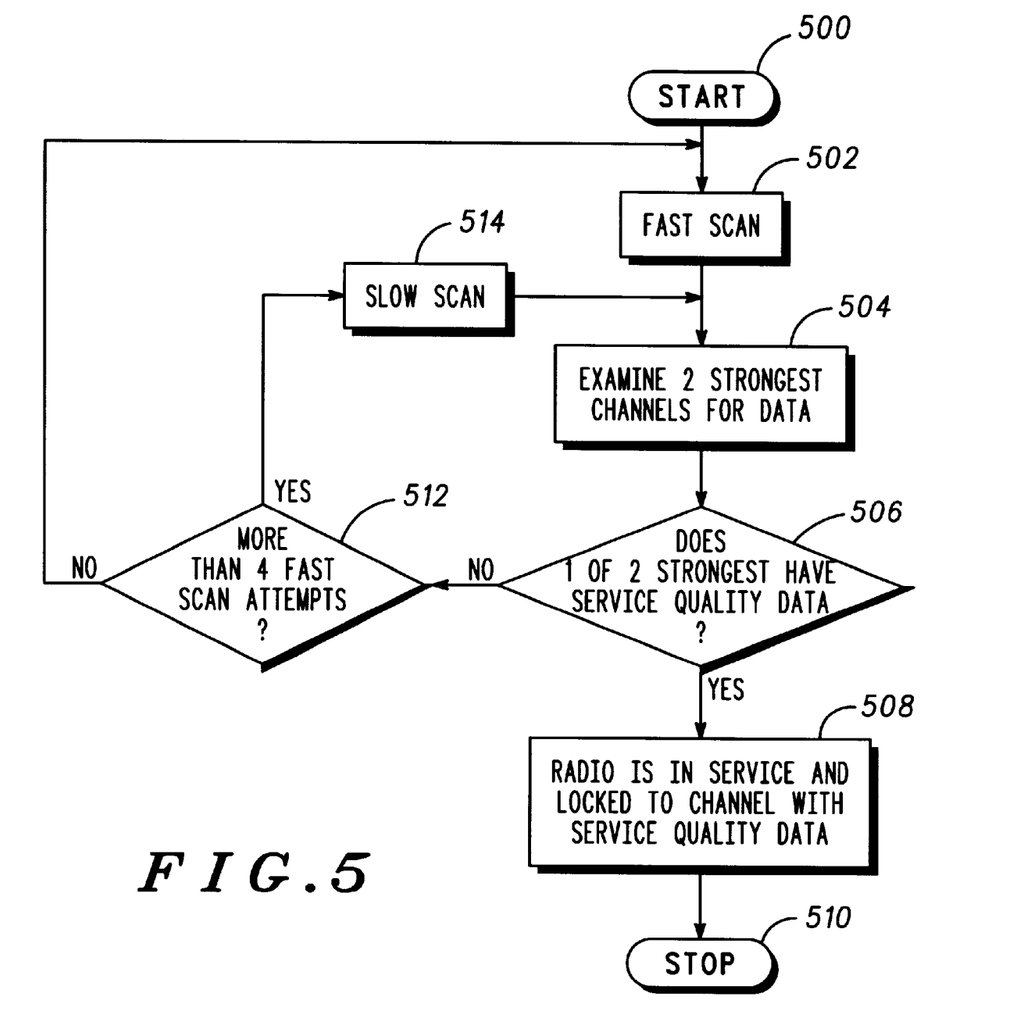
FIG. 5 illustrates a flow chart of the scanning method employed by radio apparatus of FIG. 3.

As stated, microprocessor 340 operates radio apparatus 304 by executing algorithms stored in memory 342. One such algorithm is a channel scanning algorithm. While not in service, radio apparatus 304 scans through all of the data channels in radio communication system 300. In order to save battery power during scanning, power to receive circuitry 310 is intermittently interrupted. FIGS. 4 and 5 illustrate a battery saving channel scanning method employed by radio apparatus 304. The battery saving channel scanning method is embodied in the channel scanning algorithm stored in memory 342 and executed by microprocessor 340.

During channel scanning, transmit circuitry 316 is powered off to save battery power. Transmit circuitry 316 includes a transmit switch circuit (not shown), similar to receive switch circuit 330, which is controllable by microprocessor 340 to power off transmit circuitry 316.

The operation of radio apparatus 304 will now be described with reference to FIGS. 3 through 5. The scanning method is initiated when receive circuitry 310 is powered on at to (block 500 of FIG. 5). Microprocessor 340 initiates a fast scan (block 502 of FIG. 5) for a time period $T_1$. During $T_1$ the channels are scanned one at a time. As used herein, for each channel, scanning generally includes tuning receive circuitry 310 to a channel; reading the reception strength of the channel a first time; powering off receive circuitry 310; powering on receive circuitry 310; re-tuning receive circuitry 310 to the same channel; reading the reception strength of the channel a second time; tuning to a second channel, reading the reception strength of the second channel a first time; powering off receive circuitry 310; and continuing this process until the reception strength of each channel is read twice.

The fast scanning method employed by radio apparatus 304 during $T_1$, which comprises times $t_0$ through $t_8$, is as follows. At $t_0$, microprocessor 340 controls switch circuit 330 to power on receive circuitry 310. Between $t_0$ and $t_1$, microprocessor 340 tunes receiver 320. Microprocessor 340 programs the receive frequency synthesizer 322 by sending the channel select signal designating a first channel to receive frequency synthesizer 322. After receive frequency synthesizer 322 is programmed to the first channel, receiver 320 locks to the first channel. At $t_1$, RSSI generator 324 takes a first signal strength voltage reading of the receive signals on the first channel. RSSI generator 324 couples the first reading to memory 342 via microprocessor 340. Immediately after $t_1$, microprocessor 340 controls switch circuit 330 to power off receive circuitry 310. In the illustrated embodiment, the time period between $t_0$ and $t_1$ is 5 ms.

Between $t_1$ and $t_2$, receive circuitry 310 remains off. Receive circuitry 310 is kept off for a sufficient period of time so that in a multipath environment, statistically, the two consecutive signal strength voltage readings will not be taken within the same fade. A minimum recommended time period is 20 ms. In the illustrated embodiment, the time period between $t_1$ and $t_2$ is 30 ms.

At $t_2$, microprocessor 340, responsive to a wakeup signal from timer 344, controls switch circuit 330 to power on receive circuitry 310. Between $t_2$ and $t_3$, receive circuitry 310 is re-tuned to the first channel. Re-tuning to the first channel can be accomplished by re-programming receive frequency synthesizer 322 to the first channel via microprocessor 340. Re-tuning can also be accomplished by merely allowing receiver 320 to re-lock, assuming that the programming of receive frequency synthesizer 322 to the first channel is maintained when receive circuitry 310 is powered off. Re-tuning without re-programming allows receiver 320 to lock faster. By $t_3$, receiver 320 is locked to the first channel. At $t_3$, RSSI generator 324 takes a second signal strength voltage reading of the receive signals on the first channel. RSSI generator 324 couples the second reading on the first channel to memory 342 via microprocessor 340. Microprocessor 340 determines the largest reading of the first and second signal strength voltage readings and stores it, along with the first channel, in the "strongest" location of memory 342. In the illustrated embodiment, the time period between $t_2$ and $t_3$ is 5 ms and the time period between $t_0$ and $t_3$, the period over which the first channel is fast scanned, is 40 ms. Therefore, receive circuitry 310 is only on for 10 ms out of the 40 ms period during which the first channel is read during fast scanning.

At $t_3$, microprocessor 340 tunes receive circuitry 310 to a second channel. Between $t_3$ and $t_4$, receiver 320 locks to the second channel. At $t_4$, RSSI generator 324 takes a first signal strength voltage reading of the receive signals on the second channel. RSSI generator 324 couples the first reading to memory 342 via microprocessor 340. Immediately after $t_4$, microprocessor 340 controls switch circuit 330 to power off receive circuitry 310. At $t_5$, microprocessor 340 powers on receive circuitry 310. Between $t_5$ and $t_6$, receive circuitry 310 is re-tuned to the second channel. At $t_6$, RSSI generator 324 takes a second signal strength voltage reading of the receive signals on the second channel. RSSI generator 324 couples the second reading to memory 342 via microprocessor 340. Microprocessor 340 determines the largest one of the first and second signal strength voltage readings of the second channel. Microprocessor 340 compares the largest reading of the second channel to the previous readings stored in memory 342 in the "strongest" location or the "next strongest" location and, if necessary, stores the largest reading and channel number of the second channel in the "strongest" location or the "next strongest" location.

In the illustrated embodiment, fast scanning continues in this manner until the signal strength voltage of each channel is read twice, with the receiver off between the two readings of each channel. The fast scanning process concludes at $t_8$, after RSSI generator 324 takes a second signal strength voltage reading of the signals on the last channel and couples the second reading to memory 342 via microprocessor 340. Microprocessor 340 determines the largest of the signal strength voltage readings of the last channel, compares the largest reading to the readings stored in the "strongest" and "next strongest" locations of memory 342, and stores the largest reading in the "strongest" or "next strongest" location, if necessary.

In the illustrated embodiment, $T_1$ is only approximately 840 ms. At no time during $T_1$ does control circuitry 312 determine if service quality data is present on the scanned channels. This minimizes $T_1$. Receive circuitry 310 is off for 30 of the 40 ms during the fast scan of T or off for approximately 75% of $T_1$. This minimizes battery power consumption.

At the conclusion of $T_1$, microprocessor 340 examines the channels with the two strongest signal strength voltages for data (block 504 of FIG. 5) for a time period $T_2$. The channels with the two strongest signal strength voltages were determined by microprocessor 340 and stored in the "strongest" and "next strongest" locations of memory 342 during the fast scan of $T_1$. During $T_2$, microprocessor 340 keeps receive circuitry 310 powered on. $T_2$ comprises times $t_8$ through to. At time $t_8$, microprocessor 340 reads the channel from the "strongest" location of memory 342 and tunes receive circuitry 310 thereto. Between $t_8$ and $t_9$, microprocessor 340 remains responsive to receive audio circuit 348, which examines the receive data signal for service quality data (block 506 of FIG. 5). If service quality data is found, microprocessor 340 keeps receiver 320 tuned to this channel, places radio apparatus 304 in service (block 508 of FIG. 5), and ends scanning (block 510 of FIG. 5). In the illustrated embodiment, the time period between $t_8$ and $t_9$ is approximately 120 ms.

If service quality data is not found on the channel stored in the "strongest" location of memory 342, microprocessor 340 reads the channel from the "next strongest" location of memory 342 and tunes receiver 320 thereto at time $t_9$. Between $t_9$ and $t_{10}$, microprocessor 340 remains responsive to receive audio circuit 348, which examines the receive data signal for service quality data (block 506 of FIG. 5). If service quality data is found, microprocessor 340 keeps receiver 320 tuned to this channel, places radio apparatus 304 in service (block 508 of FIG. 5), and ends scanning (block 510 of FIG. 5). In the illustrated embodiment, the time period between $t_9$ and $t_{10}$ is approximately 120 ms.

If service quality data is not found on either of the channels stored in the "strongest" and "next strongest" locations of memory 342, microprocessor 340 determines if more than a predetermined number of consecutive fast scans has occurred (block 512 of FIG. 5). If more than the predetermined number of consecutive fast scans has not occurred, another fast scan is performed (block 502 of FIG. 5). If more than the predetermined number of consecutive fast scans has occurred, the predetermined number in the illustrated embodiment being four, the scanning method executes a slow scan (block 514 of FIG. 5) at time $t_{10}$.

The slow scan occurs over a time period $T_3$. During $T_3$ all of the control channels are scanned one at a time. The events of the slow scan are similar to those of the fast scan of period $T_1$. For example, at $t_{10}$, microprocessor 340 powers on receive circuitry 310 and tunes receive circuitry 310 to the first control channel. Between $t_{10}$ and $t_{11}$, receiver 320 locks to the first channel. At $t_{11}$, RSSI generator 324 takes a first signal strength voltage reading on the first channel and couples the first reading to memory 342 via microprocessor 340. Immediately after $t_{11}$, microprocessor 340 powers off receive circuitry 310. In the illustrated embodiment, the time period between $t_{10}$ and $t_{11}$ is equal to the time period between $t_0$ and $t_1$ of the fast scan, 5 ms.

However, the slow scan differs from the fast scan in the amount of time that receive circuitry 310 remains off. The period between $t_{11}$ and $t_{12}$, wherein receive circuitry 310 is off, is preferably 110 ms.

The events at $t_{12}$ and $t_{13}$ of the slow scan are similar to those of $t_2$ and $t_3$ of the fast scan. For example, at $t_{12}$, microprocessor 340 powers on receive circuitry 310. Between $t_{12}$ and $t_{13}$, receiver 320 again locks to the first channel. At $t_{13}$, RSSI generator 324 takes a second signal strength voltage reading on the first channel and couples the second reading to memory 342 via microprocessor 340. In the illustrated embodiment, the time period between $t_{12}$ and $t_{13}$ is similar to the time period between $t_2$ and $t_3$, that is 5 ms. The time period between $t_{10}$ and $t_{13}$ over which the first channel is slow scanned, is preferably 120 ms. Therefore, receive circuitry 310 is only on for 10 ms out of the 120 ms period over which the first channel is slow scanned.

Slow scanning continues in the aforementioned manner until all of the remaining data channels are scanned and period $T_3$ expires.

Although $T_3$ is substantially longer in duration than $T_1$, receive circuitry 310 is off for approximately 92% of $T_3$, thereby, minimizing battery power consumption.

At the expiration of $T_3$ and the completion of slow scan, microprocessor 340 proceeds to examine the channels with the two strongest signal strength voltages as determined during the slow scan (block 504 of FIG. 5). The two strongest channels of the slow scan are examined in the same manner previously discussed in relation to the fast scan (blocks 506 through 512 of FIG. 5).

Although radio apparatus 304 is illustrated as a cellular radiotelephone, the present invention will also find application in radios, televisions, cordless telephones, two-way radios, pagers, personal digital assistants, and the like, and "apparatus" as used herein shall refer to all such battery powered electronic devices and their equivalents.

Thus it can be seen that a scanning apparatus and a scanning method are disclosed that save battery power. Unlike prior art scanning methods, battery power conservation begins immediately after the receive circuitry is powered on. Lengthy periods where the receiver is powered off are avoided in order to increase the opportunity for the radiotelephone to find service quality data. Also, by performing data checks on only a limited number of channels (i.e., those that are most likely to have service quality data), receiver on time is reduced and greater battery savings are realized.

What is claimed is:

1. A method of operating a radio to obtain service on a radio communication system having a plurality of channels, the radio having a receiver for tuning to any one of the plurality of channels, the method comprising the steps of:
   scanning each channel of the plurality of channels for a first predetermined period of time during which the radio continually remains out of service, the step of scanning, for each channel of the plurality of channels, including the substeps of:
      powering off the receiver between taking first and second reception strength measurements, and
      selecting a strongest one of the first and second reception strength measurements to be indicative of reception strength;
   examining, for a second predetermined period of time and only after the first predetermined period of time has elapsed, data on a predetermined number of channels of the plurality of channels having strong ones of the reception strength; and
   scanning, when the data on the predetermined number of channels is not of service quality, each channel of the plurality of channels for a third predetermined period of time during which the radio continually remains out of service, the third predetermined period of time greater than the first predetermined period of time.

2. A method according to claim 1 wherein
   the substep of selecting further includes the substep of selecting a strongest one of the first and second reception strength measurements to be indicative of reception strength, and
   the first step of scanning includes the substep of storing, following the substep of selecting the reception strength.

3. A method according to claim 1 wherein the step of examining comprises the substeps of:
   tuning to a channel of the predetermined number of channels having a next strongest one of the reception strength; and
   examining quality of data on the channel of the predetermined number of channels having the next strongest one of the reception strength.

4. A method according to claim 1 wherein the step of examining comprises the substep of:
   tuning the receiver to a first channel of the predetermined number of channels having service quality data.

5. A method according to claim 1 wherein the step of examining is followed by the steps of:
   determining if the first step of scanning has occurred for a predetermined number of scans;
   proceeding to the second step of scanning when the first step of scanning has occurred for the predetermined number of scans; and
   proceeding to the first step of scanning when the first step of scanning has not occurred for the predetermined number of scans.

6. A method according to claim 1 wherein
   the step of powering off the receiver between taking measurements further comprises the substep of powering off the receiver for a fourth predetermined period of time, and
   the step of scanning further comprises the substep of powering on the receiver to take the first and second reception strength measurements for a fifth predetermined period of time, the fifth predetermined period of time less than the fourth period of time.

7. A method according to claim 6 wherein the second step of scanning, for each channel of the plurality of channels, includes the substeps of:
   powering on the receiver for a sixth predetermined period of time to take first and second reception strength measurements, the sixth predetermined period of time substantially equal to the fifth predetermined period of time, and powering off the receiver for a seventh predetermined period of time between taking the first and second reception strength measurements, the seventh predetermined period of time greater than the fourth and sixth predetermined periods of time.

8. A method according to claim 1 wherein the second step of scanning, for each channel of the plurality of channels, includes the substeps of:

powering on the receiver for a sixth predetermined period of time to take first and second reception strength measurements, and powering off the receiver for a seventh predetermined period of time between taking the first and second reception strength measurements, the seventh predetermined period of time greater than the sixth predetermined period of time.

9. A method according to claim 1 wherein the first predetermined period of time is approximately one-third of the third predetermined period of time.

10. A method according to claim 1 wherein during the first step of scanning the receiver is powered off for approximately seventy-five percent of the first predetermined period of time.

11. A method according to claim 1 wherein during the second step of scanning the receiver is powered off for over ninety percent of the third predetermined period of time.

12. A radiotelephone powered by a battery having a not in service state and an in service state, the radiotelephone comprising:

an antenna;

transmit circuitry coupled to the antenna;

a receiver coupled to the antenna and being tunable to any one of a plurality of channels of a radio communication system;

a receive frequency synthesizer coupled to the receiver for tuning the receiver;

a RSSI (received signal strength indicator) generator coupled to the receiver for taking measurements of reception strength of a tuned one of the plurality of channels;

a switch circuit coupled between the battery and all of the receiver, the receive frequency synthesizer, and the RSSI generator for connecting or disconnecting power thereto;

a timer for timing a first predetermined period of time;

a memory for storing reception strengths and corresponding channels;

a receive audio circuit coupled to the receiver for detecting service quality data on a channel with a strongest one of the reception strengths; and a microprocessor coupled to all of the transmit circuitry, the receive frequency synthesizer, the switch circuit, the timer, the memory, and the receive audio circuit, the microprocessor, while the radiotelephone is in the not in service state, scanning each of the plurality of channels one at a time without attempting to put the radiotelephone in the in service state, the microprocessor for each channel, during scanning: controlling the receive frequency synthesizer to tune to one channel, storing a first reception strength measurement of the one channel in the memory, controlling the switch circuit to disconnect power, controlling, responsive to expiration of the timer, the switch circuit to reconnect power, storing a second reception strength measurement of the one channel in the memory, and selecting a strongest one of the first and second reception strength measurements to be indicative of a reception strength of the one channel, and the microprocessor, after scanning is completed, attempting to put the radiotelephone in the in service state, by: comparing the reception strength of the one channel to previous reception strengths of other channels, controlling the receive frequency synthesizer to tune to the channel with a strongest reception strength, and, responsive to the receive audio circuit, placing the radiotelephone in the in service state when service quality data is detected on the channel with the strongest reception strength.

13. A method of scanning among a plurality of channels of a radio apparatus when the radio apparatus is not in service, the radio apparatus including a receiver for tuning to any one of the plurality of channels, the method comprising the steps of:

scanning, for a first predetermined period of time, each channel of the plurality of channels, the step of scanning, for each channel of the plurality of channels, including the substeps of:

taking two reception strength measurements, powering off the receiver for a second predetermined period of time between taking the two reception strength measurements, and selecting the strongest one of the two reception strength measurements to be indicative of reception strength;

examining, for a third predetermined period of time, data on at least two channels of the plurality of channels when the step of scanning is completed, the step of examining comprising the substeps of:

examining data on the channel of the plurality of channels having a strongest one of the reception strength, and examining data on the channel of the plurality of channels having a next strongest one of the reception strength; and scanning, for a fourth predetermined period of time, each channel of the plurality of channels when the data on the at least two channels is not of service quality, the second step of scanning, for each channel of the plurality of channels, including the substeps of:

taking two reception strength measurements, powering off the receiver for a fifth predetermined period of time between the second step of taking the two reception strength measurements, and selecting the strongest one of the two reception strength measurements to be indicative of reception strength.

14. A method according to claim 13 wherein the first predetermined period of time is approximately one-third of the fourth predetermined period of time.

15. A method according to claim 13 wherein the fifth predetermined period of time is at least three times greater than the second predetermined period of time.

16. A method according to claim 13 wherein during the first step of scanning the receiver is powered off for approximately seventy-five percent of the first predetermined period of time.

17. A method according to claim 13 wherein during the second step of scanning the receiver is powered off for over ninety percent of the fourth predetermined period of time.

18. A method of operating a radio to obtain service on a radio communication system having a plurality of channels, the radio including a receiver for tuning to any one of the plurality of channels, the method comprising the steps of:

scanning each channel of the plurality of channels for a first predetermined period of time during which the radio continually remains out of service, the step of scanning, for each channel of the plurality of channels, including the substeps of:
- taking first and second reception strength measurements,
- powering off the receiver for a second predetermined period of time between taking the first and second reception strength measurements,
- powering on the receiver for a third predetermined period of time when the receiver is not powered off, the third predetermined period of time less than the second predetermined period of time, and
- selecting one of the first and second reception strength measurements to be indicative of reception strength; and attempting, after the first predetermined period of time has elapsed, to obtain service on the channel of the plurality of channels having a strongest reception strength.

19. A method of operating a radio to obtain service on a radio communication system having a plurality of channels, the radio including a receiver for tuning to any one of the plurality of channels, the method comprising the steps of:

scanning each channel of the plurality of channels for a first predetermined period of time during which the radio continually remains out of service, the step of scanning, for each channel of the plurality of channels, including the substeps of:
- taking first and second reception strength measurements,
- powering off the receiver for a second predetermined period of time between taking the first and second reception strength measurements, the second period of time greater than or equal to 20 ms,
- powering on the receiver for a third predetermined period of time between powering off for successive ones of the plurality of channels, the third predetermined period of time less than 20 ms, and
- selecting one of the first and second reception strength measurements to be indicative of reception strength; and attempting, after the first predetermined period of time has elapsed, to obtain service on the channel of the plurality of channels having a strongest reception strength.

* * * * *